June 1, 1954
R. C. GOERTZ ET AL
2,679,940
ELECTRICAL MANIPULATOR
Filed June 28, 1951
13 Sheets-Sheet 1
FIG.1
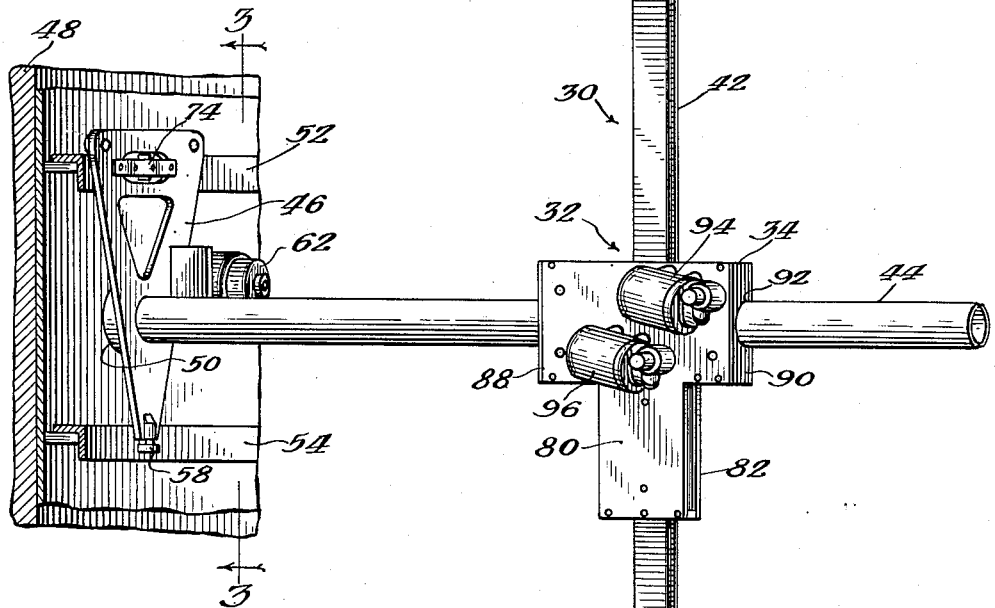
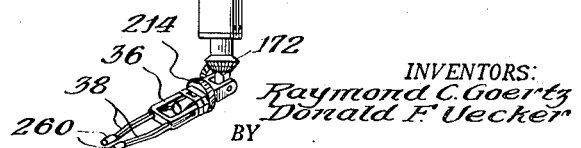
INVENTORS:
Raymond C. Goertz
Donald F. Uecker
BY
Roland A. Anderson
Attorney

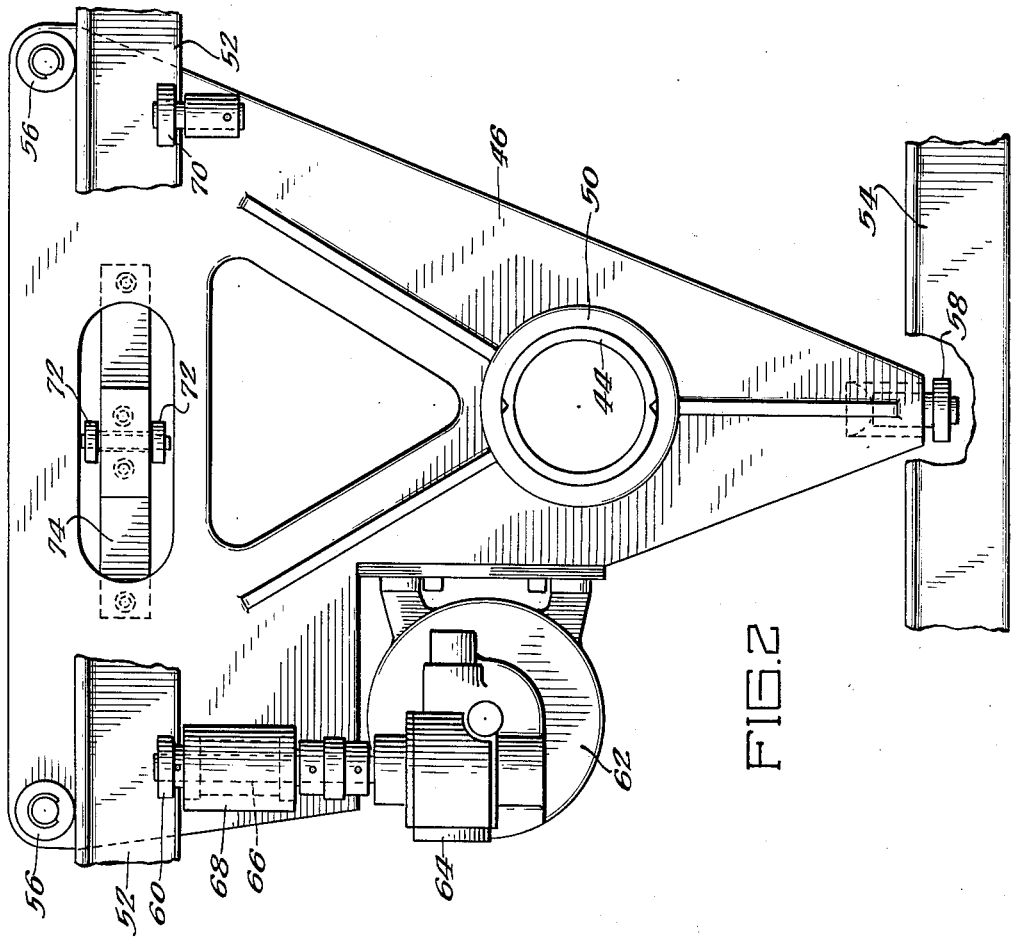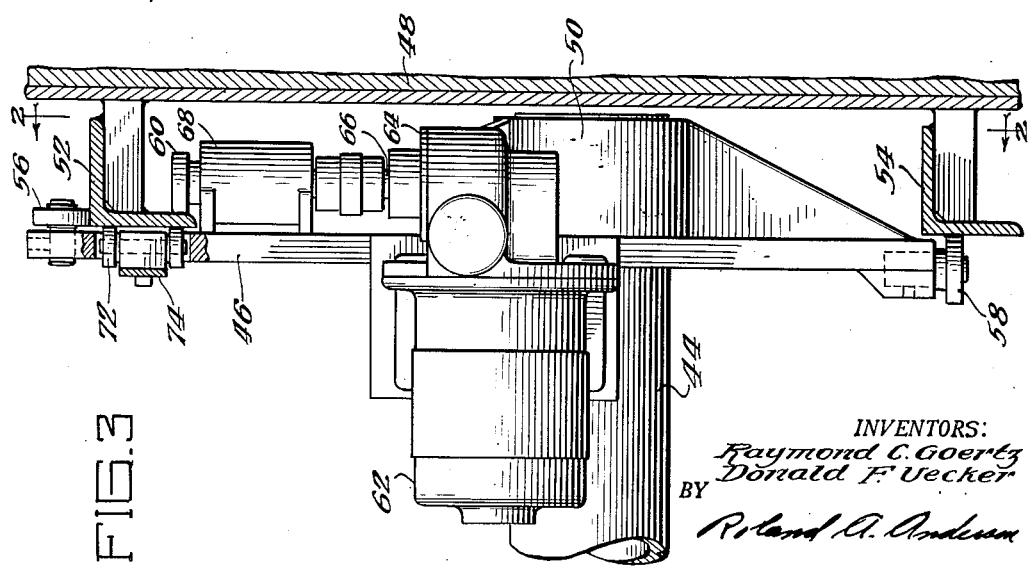

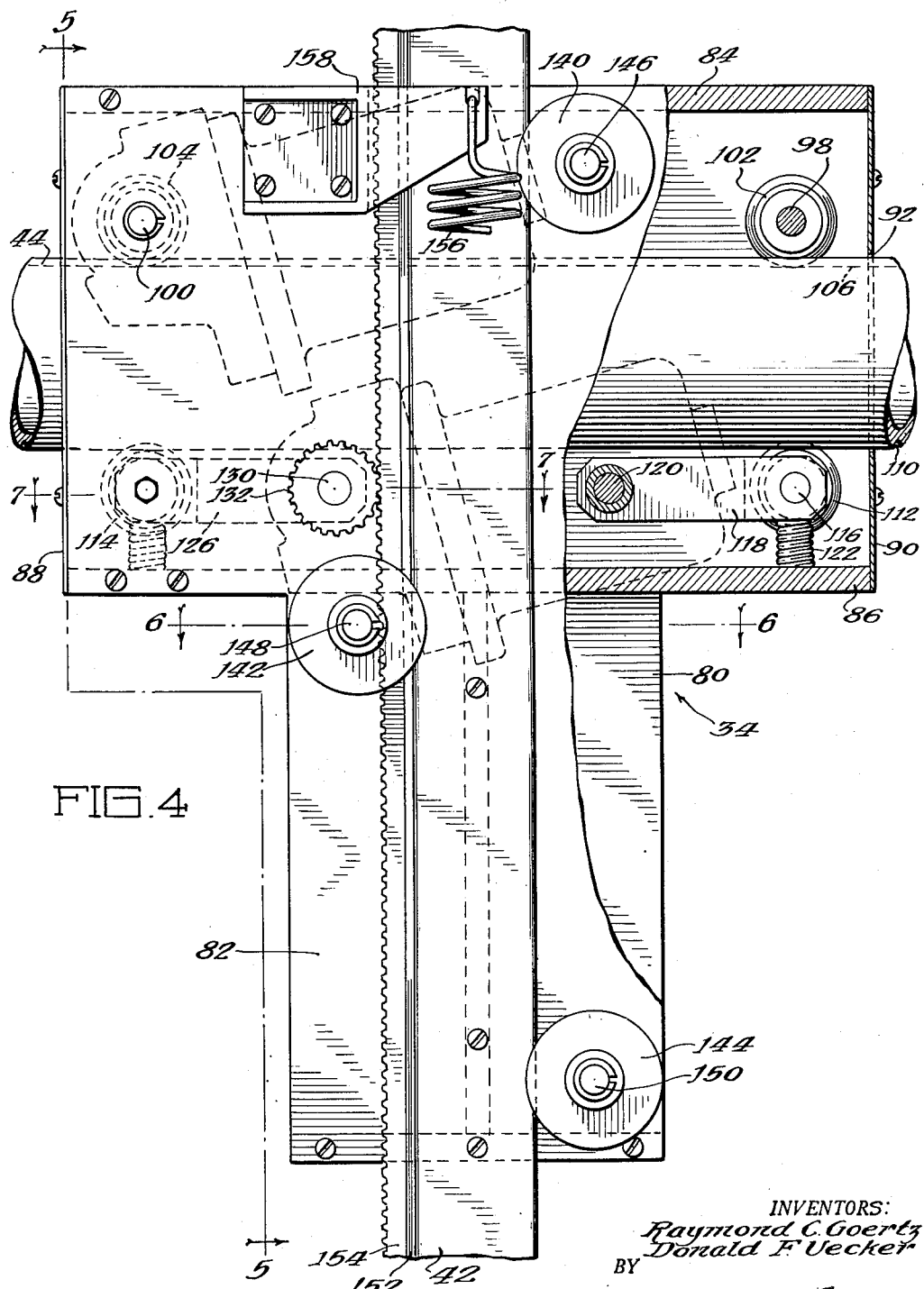

June 1, 1954

R. C. GOERTZ ET AL 2,679,940

ELECTRICAL MANIPULATOR

Filed June 28, 1951

INVENTORS:
Raymond C. Goertz
Donald F. Vecker
BY
Roland A. Anderson
Attorney.

June 1, 1954

R. C. GOERTZ ET AL 2,679,940

ELECTRICAL MANIPULATOR

Filed June 28, 1951

INVENTORS:
Raymond C. Goertz
Donald F. Uecker
BY
Roland A. Anderson
Attorney

June 1, 1954  R. C. GOERTZ ET AL  2,679,940
ELECTRICAL MANIPULATOR
Filed June 28, 1951                                                                 13 Sheets-Sheet 6
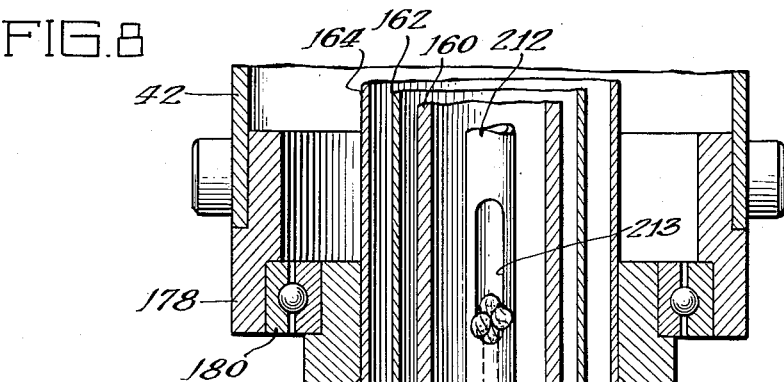
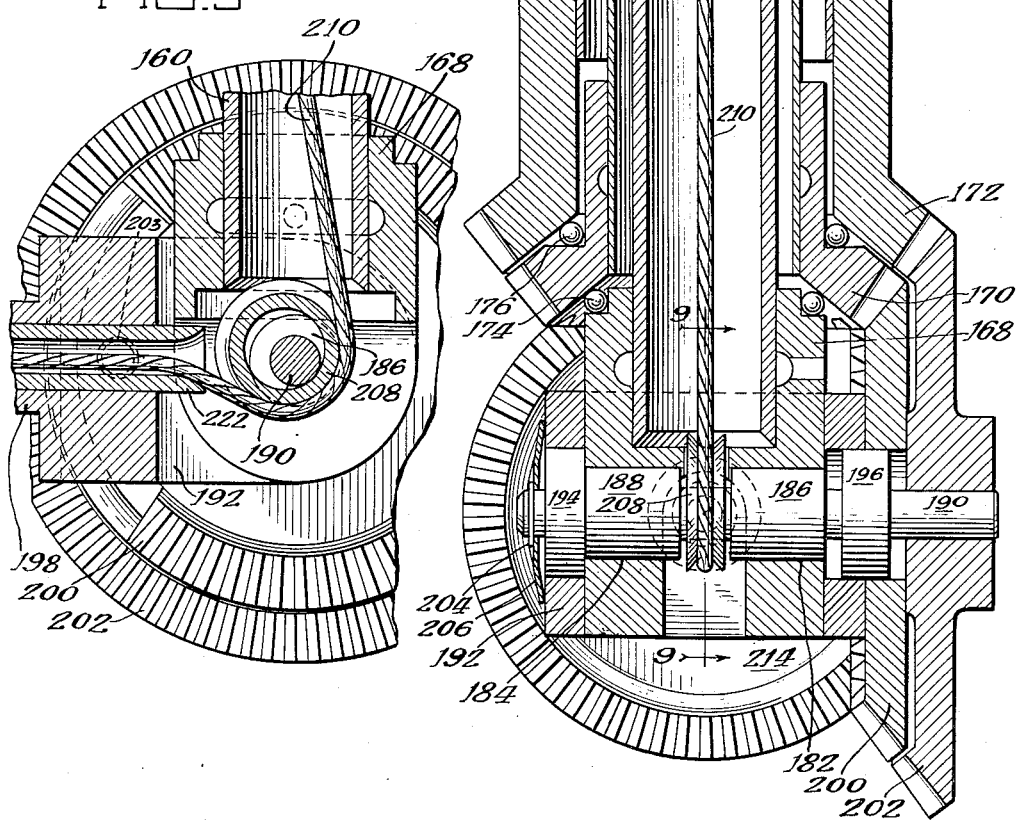
INVENTORS:
Raymond C. Goertz
Donald F. Vecker
BY
Roland A. Anderson
Attorney

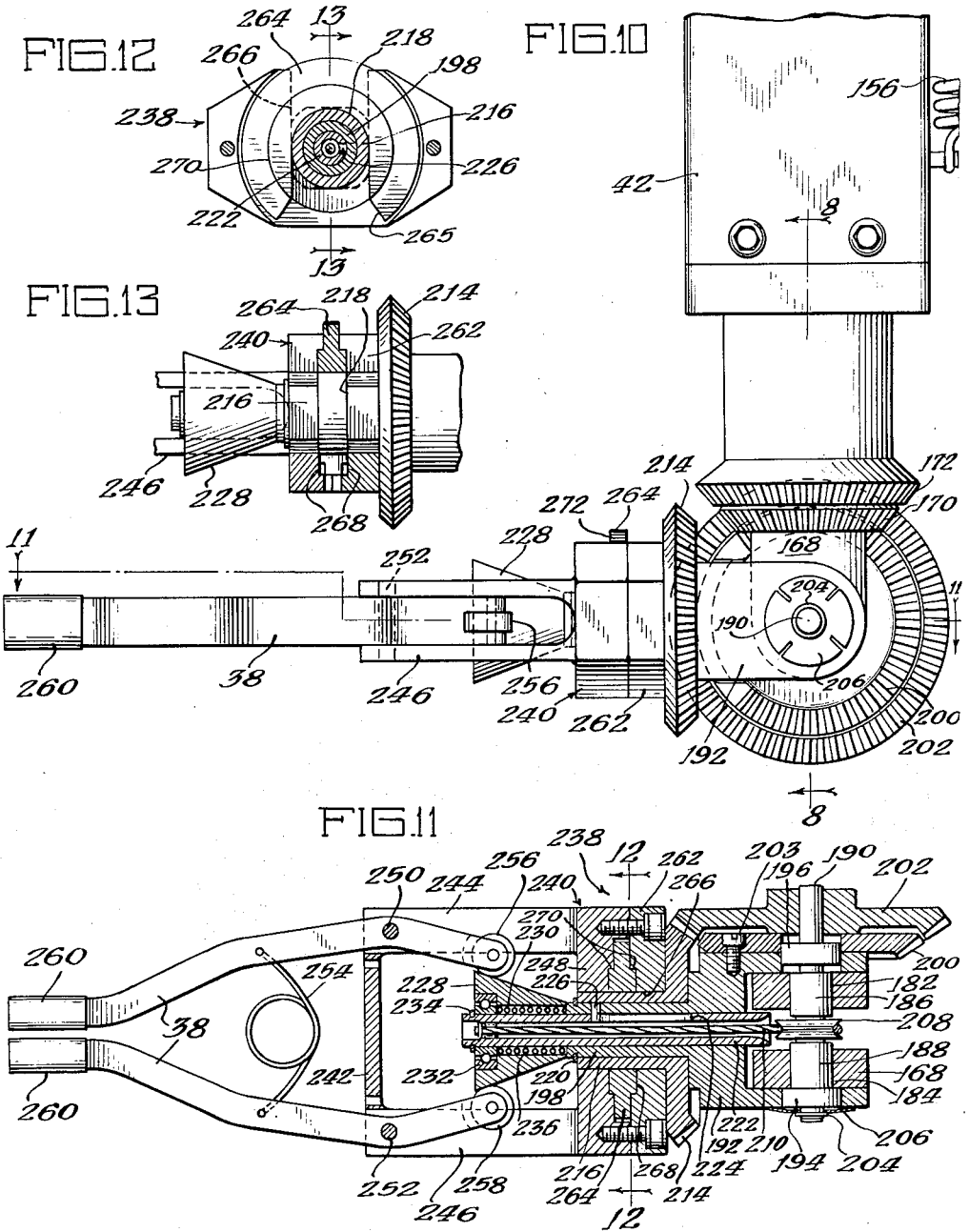

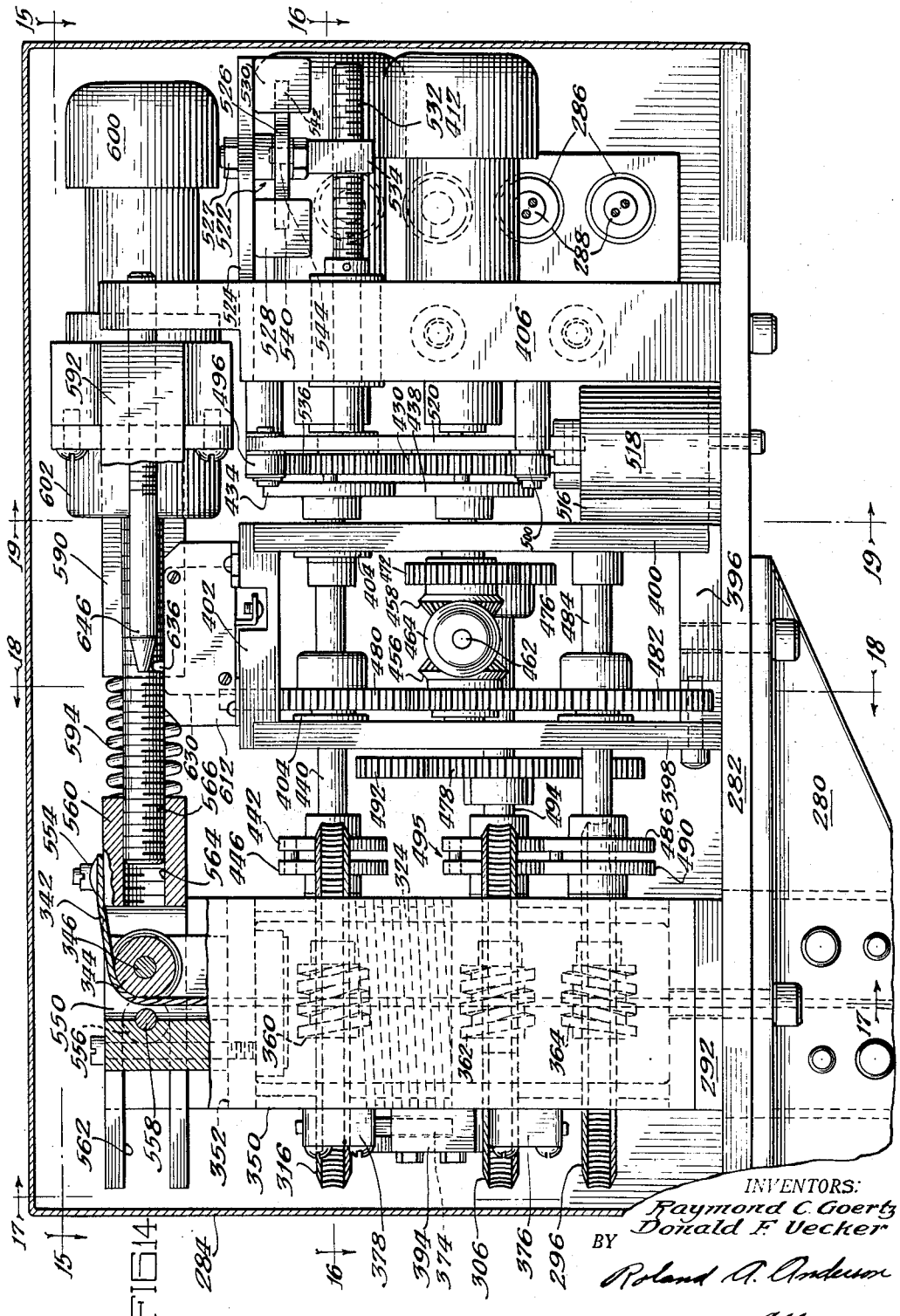

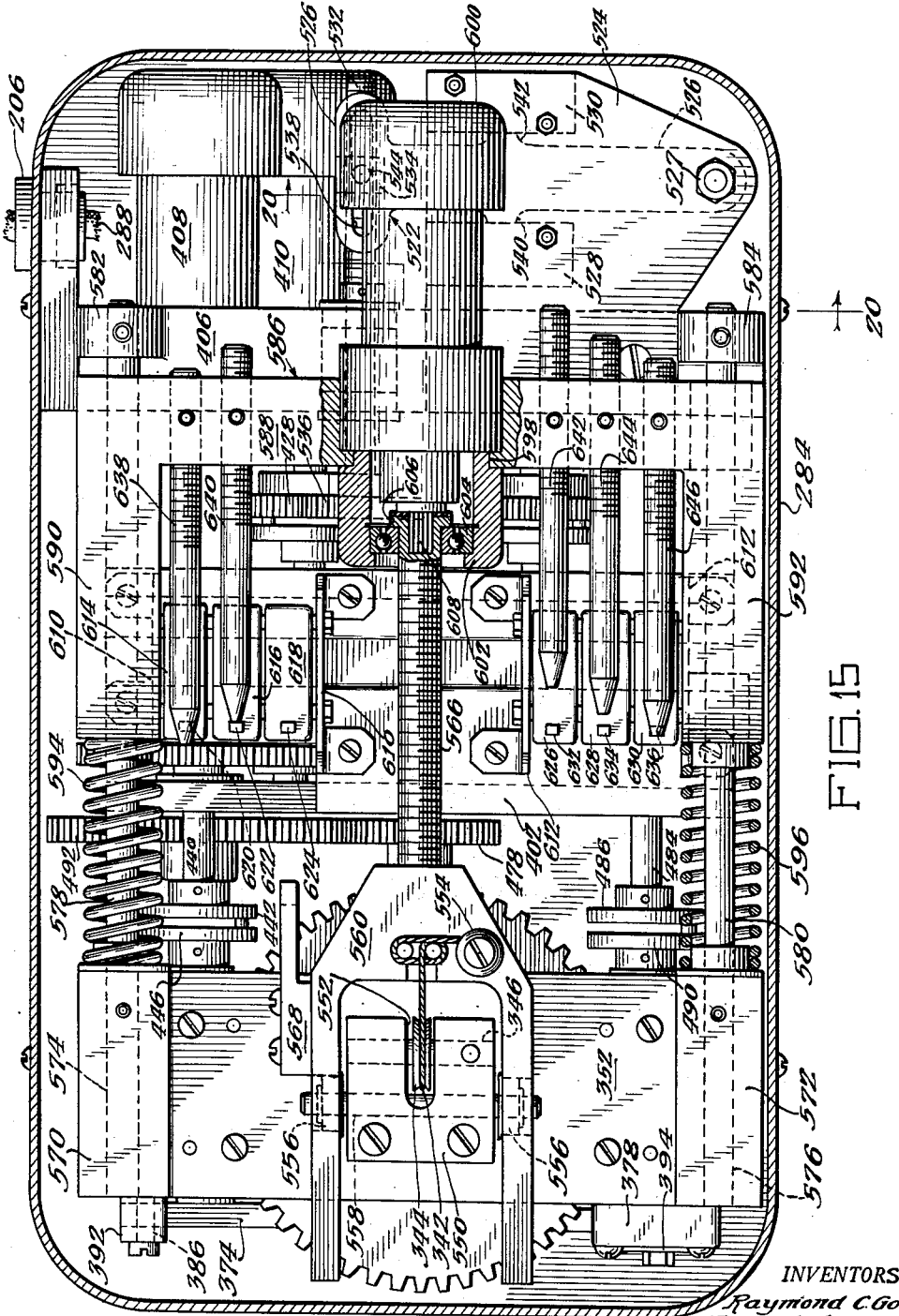

June 1, 1954 R. C. GOERTZ ET AL 2,679,940
ELECTRICAL MANIPULATOR
Filed June 28, 1951 13 Sheets-Sheet 10

INVENTORS:
Raymond C. Goertz
Donald F. Vecker
BY
Roland A. Anderson
Attorney.

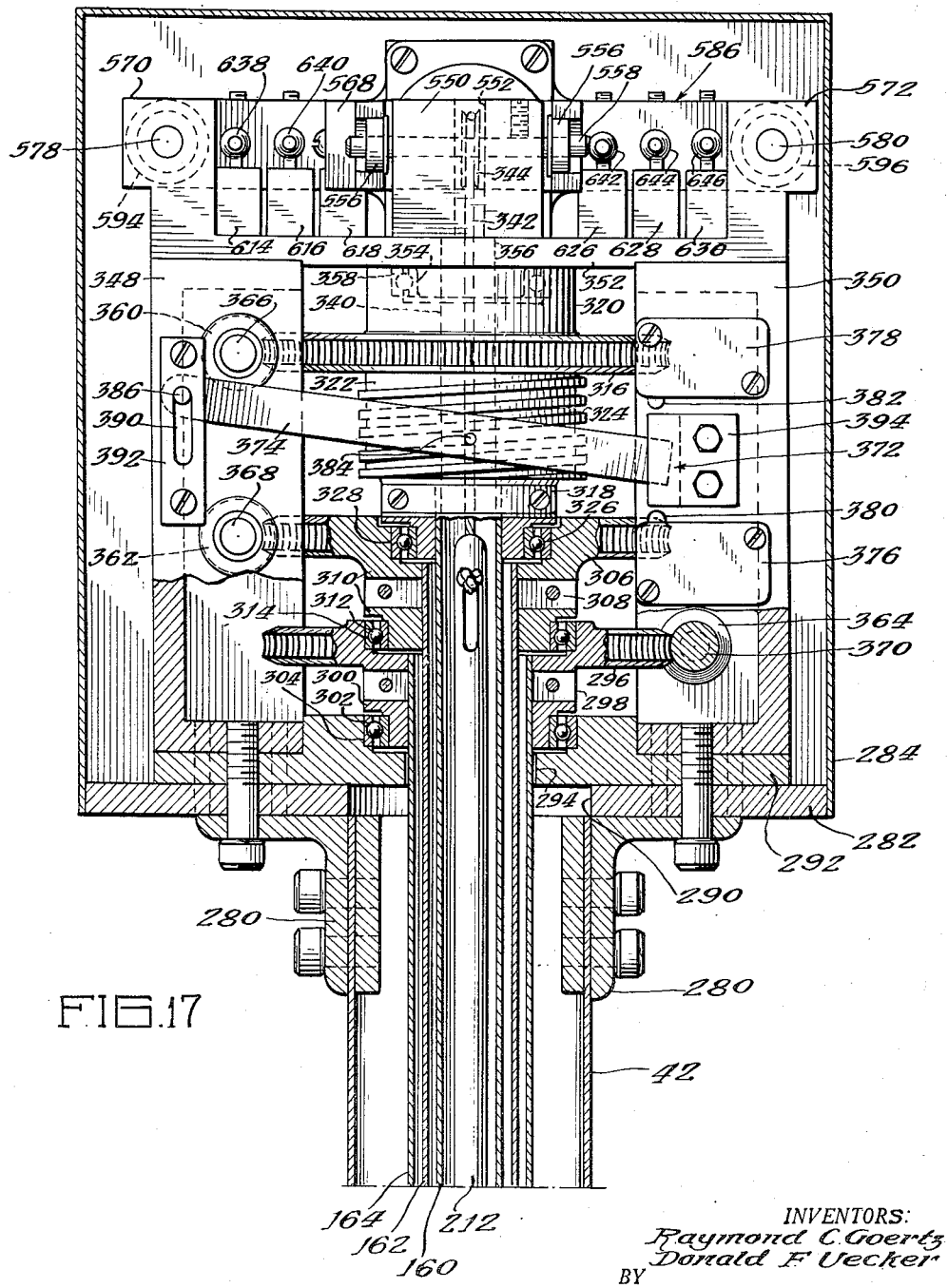

June 1, 1954  R. C. GOERTZ ET AL  2,679,940
ELECTRICAL MANIPULATOR
Filed June 28, 1951  13 Sheets-Sheet 12

INVENTORS:
Raymond C. Goertz
Donald F. Uecker
BY
Roland A. Anderson
Attorney

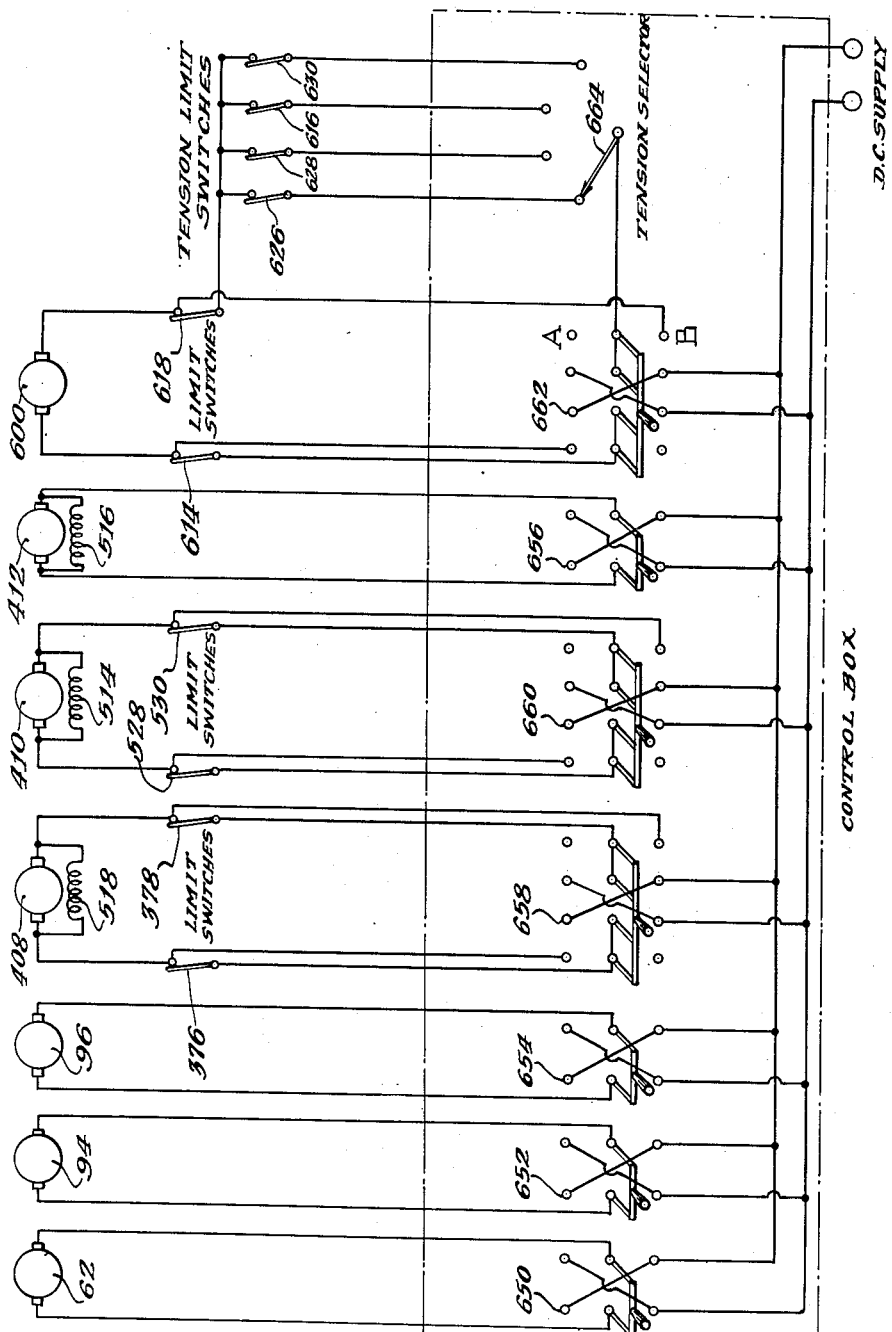

Patented June 1, 1954

2,679,940

UNITED STATES PATENT OFFICE 2,679,940

ELECTRICAL MANIPULATOR

Raymond C. Goertz and Donald F. Uecker, Elmhurst, Ill., assignors to the United States of America as represented by the United States Atomic Energy Commission Application June 28, 1951, Serial No. 234,128

14 Claims. (Cl. 214—1)

The present invention relates to a device for remote control manipulation. More particularly it pertains to an electrically operated remote control manipulator.

Recent developments in radioactive substances have resulted in the increased importance of remote control devices because of the detrimental effect to human welfare of exposure to radioactivity. With such a device an operator can perform his maneuvers with impunity from behind a protective wall, observing his work indirectly. Application of remote control devices, however, is not confined to the radioactivity field for they are readily adapted to use in other fields of endeavor, such as laboratories conducting research in bacteria, noxious matter and the like.

The present invention provides a remote control manipulator which is capable of performing extremely delicate operations with accuracy in a confined work space.

The invention will be understood from the following description and the appended drawings, in which:

Figure 1 is a perspective view of the manipulator, showing a vertical tube, a carriage by which said tube is disposed on a cantilever, and a mounting frame by which the assembly is mounted to horizontal rails on a wall;

Figure 2 is a rear elevational view of the mounting frame by which the manipulator is mounted on the rails on the wall;

Figure 3 is a side view of the frame partly in section;

Figure 4 is a rear elevational view of the carriage of Figure 1;

Figure 8 is a vertical view in section of a gear assembly at the lower end of the tube, taken along the line 8—8 of Figure 10 (to be described below);

Figure 9 is a sectional view taken on the line 9—9 of Figure 8;

Figure 10 is an elevational view of the gear assembly and tongs attached thereto;

Figure 11 is a plan view partly in section taken along the line 11—11 of Figure 10, showing the manner in which the tongs are attached to the gear assembly;

Figure 12 is a sectional view taken along the line 12—12 of Figure 11;

Figure 13 is a vertical sectional view taken on the line 13—13 of Figure 12;

Figure 14 is an elevational view of a differential gear assembly at the upper end of the tube, showing in section the housing for said assembly which is shown in elevation in Figure 1;

Figure 15 is a plan view partly in section taken along the line 15—15 of Figure 14 of the differential gear assembly shown in Figure 14;

Figure 17 is an end view partly in section of the differential gear assembly taken on the line 17—17 of Figure 14;

Figure 21 is a schematic wiring diagram for the manipulator.

Figures 5, 6:
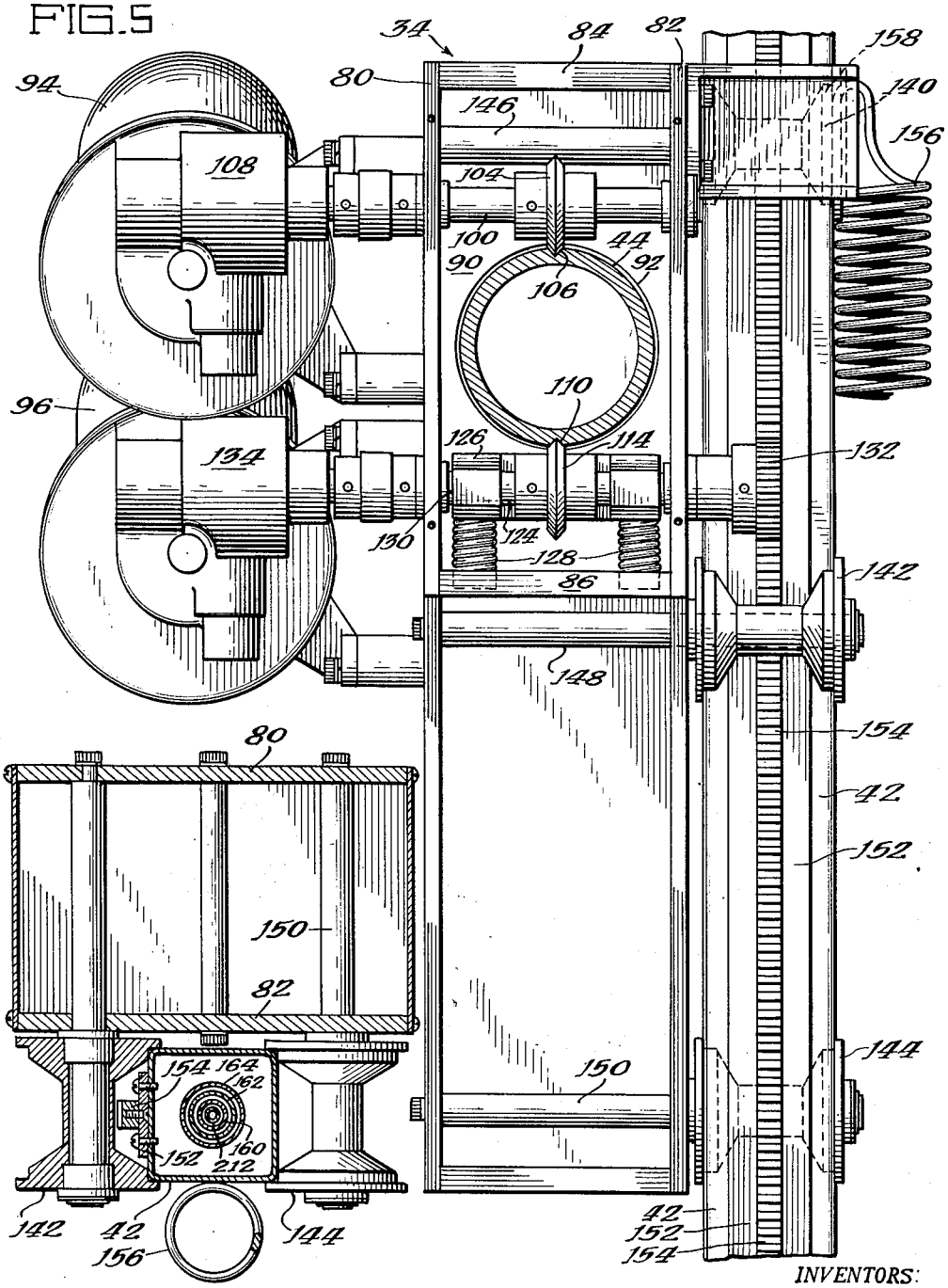
Figure 5 is a side view of the carriage, taken on the line 5—5 of Figure 4.
Figure 6 is a horizontal sectional view taken on the line 6—6 of Figure 4.

The manipulator constituting the embodiment of the invention to be described is generally indicated at 30 in Figure 1. It comprises a supporting unit generally indicated at 32, a carriage 34, tongs 36 having a pair of movable jaws 38 and a differential gear assembly generally indicated at 40.

The supporting unit 32 comprises an elongated vertical tube 42, a cantilever 44, and a frame 46 which is movable horizontally along a wall 48 in a manner to be described below. By virtue of the supporting unit 32, the manipulator 30 is adapted to move in three linear directions. The tube 42 moves vertically with respect to the carriage 34 along its longitudinal axis; the carriage 34 moves horizontally along the cantilever 44; and the entire assembly is adapted to move horizontally along the wall 48.

Considering Figures 2 and 3, the frame 46 is substantially triangular in shape and is provided with a sleeve 50 integral therewith, the inside diameter of which is affixed, as by sweating, to one end of the circular cantilever 44, and thereby holds it fixedly in a horizontal position. The frame 46 is mounted on an upper horizontal rail 52 and a lower horizontal rail 54, which are secured to the wall 48, by means of a pair of upper wheels 56 and a lower wheel 58. Movement of the frame 46 along the wall is provided by a friction wheel 60 which rolls along the surface of the upper rail 52 facing the wall 48, serving to retain the assembly on the rails. The friction wheel 60 is driven by a motor 62, secured to the frame 46, which is geared by means of a conventional reduction gear box 64 to a shaft 66. In turn, the shaft 66 is held in place by a journal 68 that is integral with the frame 46. Secured to the top of the shaft 66 is the friction wheel 60. On the same horizontal level with said friction wheel is a roller 70 which, together with a pair of back-up wheels 72, serve to maintain constant alignment of the wheels 56 and 58 with the rails 52 and 54, respectively, no matter what torsional force is applied by the manipulator 30 to the cantilever 44. The back-up wheels 72 are secured to a strap 74 and roll along the surface of the rail 52 opposite that contacted by the wheel 60 and the roller 70.

The carriage 34 (Figures 4–6) comprises a front housing plate 80 and a back housing plate 82 which are disposed parallel to each other on opposite sides of the cantilever 44. These plates are held rigidly in place by a top plate 84 and a bottom plate 86 together with end plates 88 and 90 (Figure 4) which are apertured at 92 to accommodate the cantilever 44.

Figure 7:
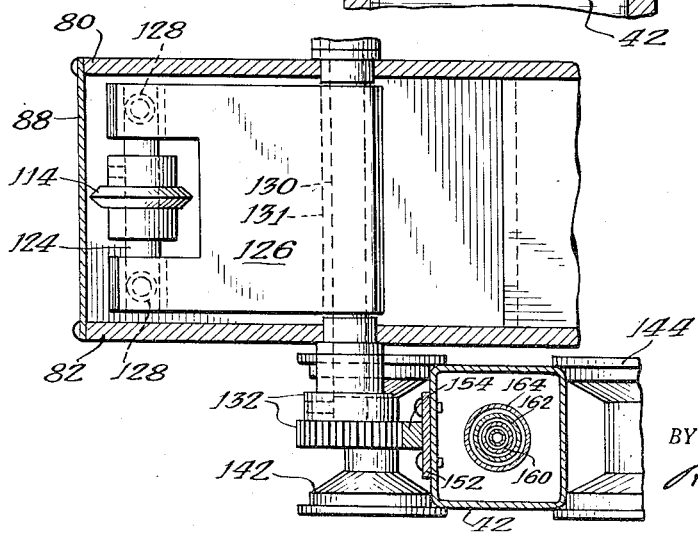
Figure 7 is a fragmentary sectional view taken on the line 7—7 of Figure 4.

Secured to the front plate 80 are two motors 94 and 96 (Figure 5). The motor 94 moves the carriage 34 horizontally along the cantilever 44, while the motor 96 actuates the tube 42 up and down with respect to said carriage. With respect to the horizontal movement of the carriage 34 along the cantilever 44, reference is made to Figures 4 and 5 in which two shafts 98 and 100 are seen to be journalled in the front plate 80 and the back plate 82 near the top of the carriage. To the shafts 98 and 100 are secured rollers 102 and 104, respectively, centrally between the plates 80 and 82. Each roller is provided with a knife-edge periphery in order to fit a V-groove 106 extending longitudinally along the top of the cantilever 44. By virtue of this arrangement the carriage 34 is moved in either direction along the cantilever 44 by the reversible motor 94 which is provided with a reduction gear box 108 and which is coupled in a conventional manner to the shaft 100. As a precaution against angular rotation of the carriage 34 about the longitudinal axis of the cantilever 44, two rollers 112 and 114 are provided to fit a V-groove 110, disposed along the bottom side of the cantilever 44 opposite the groove 106. The rollers 112 and 114 are similar to the rollers 102 and 104. The roller 112 is centrally disposed between the plates 80 and 82 and directly below the roller 102, and is mounted on a shaft 116 that is fixed in a U-shaped shackle 118. The shackle 118 in turn is pivoted on a shaft 120, the ends of which are secured to the plates 80 and 82. Two springs 122 are provided beneath the free end of said shackle in order to serve as shock absorbers for the roller 112 and to hold it in secure engagement with the groove 110. Similarly, the roller 114 is mounted in the groove 110 and is secured to a shaft 124 (Figures 5 and 7), the ends of which are disposed in a shackle 126 directly above a pair of springs 128 which serve as shock absorbers for said roller. Likewise, the shackle 126 is pivoted on a shaft 130 within a sleeve bearing 131 (Figure 7). The shaft 130 extends on either side through the plates 80 and 82 in which said shaft is journalled. To the extremity of the shaft 130 extending beyond the plate 82 is affixed a pinion 132 the purpose of which will be described below. The other end of the shaft 130, extending beyond the plate 80, is coupled in a conventional manner to a reduction gear box 134 on the reversible motor 96.

Adjacent the back plate 82 the tube 42 is vertically mounted on the exterior of the carriage 34. Extending perpendicularly from the plate 82 three guide rollers 140, 142 and 144 are disposed on shafts 146, 148 and 150, respectively, to maintain the tube 42 in vertical position. The guide roller 140 is disposed directly above the guide roller 144 on the same side of the tube 42, while the guide roller 142 is disposed on the opposite side of said tube at a location substantially half way between guide rollers 140 and 144. (Figures 4, 5 and 6.) On the side of the square tube 42 facing the pinion 132 is secured a rib 152 which furnishes a support for an elongated rack 154 which is engaged by said pinion. Hence, the tube 42 is adapted to be moved up and down by the reversible motor 96 driving the pinion 132 on the rack 154, said tube being guided in its vertical motions by the guide rollers 140, 142, and 144. In order to reduce the load on the motor 96 a suitable spring 156 is secured at the upper end to a bracket 158 extending from the plate 82. At the lower end said spring is secured to a point near the lower end of the tube 42 (Figure 10). By virtue of the spring 156 the motor 96 is relieved of much of the weight attached to the tube 42.

The rectangular tube 42 serves as a housing for the means which operatively connect the differential gear assembly 40 to the tongs 36, which means comprise three concentric tubes 160, 162 and 164 (Figure 8). These tubes are round, the tube 160 having the smallest diameter and the tube 164 having the largest diameter. The lower end of tube 160 extends below that of tube 162 which in turn extends below that of tube 164. The tube 160 is designated as the azimuth tube. The tube 162 is designated as the elevation tube. And the tube 164 is designated as the twist tube. The tongs 36 are capable of three directional rotation, namely, azimuth or rotation in a plane normal to the vertical axis of the tube 42; elevation or rotation in a plane passing through the vertical axis of said tube; and twist or rotation of the tongs 36 about their own longitudinal axis. The manner in which these various rotations are achieved either singly or in combination will be described below. Likewise the manner in which the jaws 38 of the tongs 36 are opened and closed will be set forth.

Attached to the lower end of the azimuth tube 160 is a knuckle 168 (Figures 8 and 9), the upper portion of which is annular to accommodate said tube and the lower portion of which is bifurcated. Above the knuckle 168 is a bevel gear 170 that is secured to the lower end of the elevation tube 162. Concentrically disposed about the gear 170 is a bevel gear 172 which is affixed to the lower end of the twist tube 164. Between the contiguous surfaces of the knuckle 168 and the gear 170 and the gear 172 are disposed a plurality of ball bearings 174 and 176, respectively, which make for smooth operation between these parts. To the lower end of the rectangular tube 42 is attached a bushing 178, the upper portion of which is rectangular and the lower portion of which is annular in order to accommodate an annular bearing 180. The bearing 180 surrounds the upper end of the gear 172 thereby holding the assembly of tubes and gears centrally within the tube 42.

The means by which the tongs 36 are attached to and rotated about the lower end of the manipulator is shown in Figures 8 to 13. In the bifurcated portion of the knuckle 168 there are two apertures 182 and 184 oppositely disposed and normal to the axis of the tube 42. Needle bearings 186 and 188 are mounted in the apertures 182 and 184, respectively, in order to support a shaft 190. A yoke 192 is mounted on the shaft 190 on bearings 194 and 196 on each side of the knuckle 168. As shown in Figure 11 the yoke 192 has a stem 198 integral therewith and extending in a plane normal to the shaft 190. Two bevel gear wheels 200 and 202 are mounted on the shaft 190 and engage the gears 170 and 172, respectively. The wheel 200 is contiguous to one arm of the yoke 192 and is attached thereto by a screw 203. By such attachment the yoke 192 is caused to rotate about the shaft 190 by the wheel 200. The gear wheel 200 is smaller than the gear wheel 202, and the former is mounted on the bearing 196 while the latter is tightly secured to the shaft 190. In order to retain the shaft 190 in place a conventional split ring 204 is secured to the end opposite the gear wheel 202 which is adjacent a spring washer 206, the periphery of which contacts the yoke 192.

At the center of the knuckle 168 in the bifurcated portion a pulley 208 is mounted loosely on the shaft 190, said pulley having an aperture greater than the diameter of said shaft (Figure 9). In this manner the pulley 208 more easily accommodates a cord 210 which closes the jaws 38 of the tongs 36. The upper end of the cord 210 is secured to a cable tube 212 having a slot 213 at the lower end through which said cord is passed and knotted so that it is sustained in a taut position. The purpose of the cable tube 212, which extends centrally of the tube 160, is to reduce the loss of tautness due to stretching which would occur if the cord 210 extended throughout the length of the tube 160.

Considering more particularly the manner in which the tongs 36 are joined to the above-described assembly, attention is directed to Figure 11. In order to rotate the tongs 36 about their longitudinal axis a bevel gear 214 having a hub 216 integral therewith is mounted rotatably on the stem 198 of the yoke 192 and meshes with the gear wheel 202. In this manner rotation of the tube 164 (Figure 8) is transmitted through the gear 172 and the gear wheel 202 to the gear 214. As shown in Figures 12 and 13 the outside surface of the hub 216 is squared with rounded corners in order to transmit rotational movement from the gear 214 to the tongs 36. Around the outer portion of the hub 216 is a neck 218 by which the tongs 36 are secured thereto.

As was mentioned above, the hub 216 is rotatably disposed on the stem 198 of the yoke 192 where it is retained by a split ring 220 near the end of said stem remote from the yoke 192. The stem 198 serves as a sleeve for a rod 222 which is slidably disposed therein along its longitudinal axis and one end of which extends beyond the aforementioned end of said stem. Along a portion of the rod 222 is a longitudinal slot 224 into which extends a pin 226, one end of which pin is secured within the stem 198. Hence, the length of the slot 224 establishes the distance through which the rod 222 may be moved. Through the center of the rod 222 passes the cord 210 which is knotted at the end remote from the pulley 208 and held taut against a reduced portion of the stem bore. At the same end a cone 228 having a central bore 230 is mounted on a bearing 232 which in turn is held in place by a split ring 234.

A compression spring 236 is disposed in the bore 230 of the cone 228 and around the outer periphery of the rod 222. The spring exerts a force against the bearing 232 on one end and against the stem 198 on the other end whereby the cone 228 is held away from the stem 198 by a distance equal to that of the length of the slot 224 when tension is released in the cord 210.

The tongs 36 comprise the pair of jaws 38 and a support member generally indicated at 240 which includes a cam lock assembly, generally indicated at 238 (Figures 12 and 13) for attaching said tongs to the hub 216 of the gear 214. The support member 240 is generally rectangular in shape and includes a transverse element 242 between two parallel longitudinal elements 244 and 246 which are integral with a transverse member 248. Being oppositely disposed the elements 244 and 246 are slotted longitudinally between the element 242 and the member 248 in order to receive the jaws 38 that are pivoted oppositely to each other on pins 250 and 252. In this manner the jaws 38 are adapted to be opened by a hair spring 254 disposed therebetween and adapted to be closed when the cone 228 is retracted by the cord 210, whereby said cone bears against a pair of rollers 256 and 258 disposed on the bifurcated ends of said jaws. In order to facilitate the grasping of an object with the jaws 38, the grasping ends may be equipped with sleeves 260 of soft material such as rubber or friction tape.

The tongues 36 are attached to the hub 216 by means of the cam lock assembly 238. This assembly, similar to a jeweler's lock, is adapted for easy attachment or detachment. It comprises the support member 240, a cap 262 attached thereto on the end adjacent the gear 214, and an annular cam 264 having an opening 265 in one side thereof large enough to pass the hub 216. Along the longitudinal axis of the tongs 36 a slot 266, slightly greater than the hub 216, is disposed in the member 240 and the cap 262 and is open to one side thereof in order to receive said hub. In a plane normal to the axis of the slot 266 is an annular niche 268 having a pair of oppositely disposed shoulders 270. This niche is formed by the member 240 and the cap 262 and registers with the neck 218 around the hub 216 when said hub is disposed in the slot 266. By aligning the opening 265 in the cam 264 with the slot 266, the hub 216 may be inserted wholly into said slot and the cam 264 rotated within the niche 268 by means of a knurled surface 272 on the periphery of said cam until said hub is locked in place. At the same time the rollers 256 and 258 at each end of the jaws 38 contact the surface of the cone 228.

As was pointed out above, the tongs 36 may be manipulated into any desired position on the lower end of the tube 42. These manipulations include three directional rotations in addition to lineal movement. The rotations are separately transmitted to the tongs 36 by means of the concentric tubes 160, 162, and 164, the upper ends of which extend into the differential gear assembly 40. As shown in Figure 1, the gear assembly 40 is attached to the top of the tube 42 by means of a pair of brackets 280. The brackets 280 support a base plate 282 to which is attached a rectangular housing 284 (Figure 14). A plurality of inlets 286 are provided in said housing to receive a number of electric cables 288. These cables connect the manipulator to a conventional control box, not shown in the drawings. However, attention is directed to the wiring diagram in Figure 21 in which various parts of the manipulator are shown connected to conventional switches in the control box. Further reference to Figure 21 will be made later. As shown in Figure 17, the base plate 282 is apertured at 290 in a location centrally disposed over the tube 42. Above the plate 282 directly over said aperture is secured a mounting support 292 which is centrally apertured at 294 in alignment with the aperture 290 for the passage of the tubes 160, 162, and 164 and the cable tube 212.

The outer tube 164, being the shortest of the three, is surmounted with a worm gear 296 that is secured thereto by a clamp 298. Integral with the worm gear 296 is a hub 300, the lower end of which is mounted in a bearing 302. In turn the bearing 302 is fitted into a circular recess 304, the center of which is aligned with the center of the aperture 294 in the mounting support 292. In this manner the tube 164 is centrally disposed within the apertures 290 and 294. Extending above the upper end of the tube 164 is the upper end of the tube 162 to which is attached a worm gear 306 by means of a clamp 308. Similar to the worm gear 296, the worm gear 306 has an integral hub 310, the lower end of which is mounted in a bearing 312 that is disposed in a circular recess 314 in the upper surface of the worm gear 296. Extending above the upper end of the tube 162 is the upper end of the tube 160 to which is mounted a worm gear 316 by means of a clamp 318. The worm gear 316 differs from the worm gears 306 and 296 in that the former includes an upper hub 320 and a lower hub 322. The lower hub 322 has a helical groove 324 about its outer surface. The lower end of the lower hub 322 is seated in a bearing 326 that is mounted in a circular recess 328 in the top surface of the gear wheel 306. Centrally disposed of the gear wheel 316 and the hubs 320 and 322 is a vertical bore 340 which is aligned with and communicates with the central tube 160. Through the bore 340 passes a cord 342 which is attached to the upper end of the cable tube 212 in a manner similar to the cord 210 at the lower end thereof. The cord 342 passes over a pulley 344 which is mounted on a shaft 346 above the bore 340 and will be described more fully below.

Figure 16:
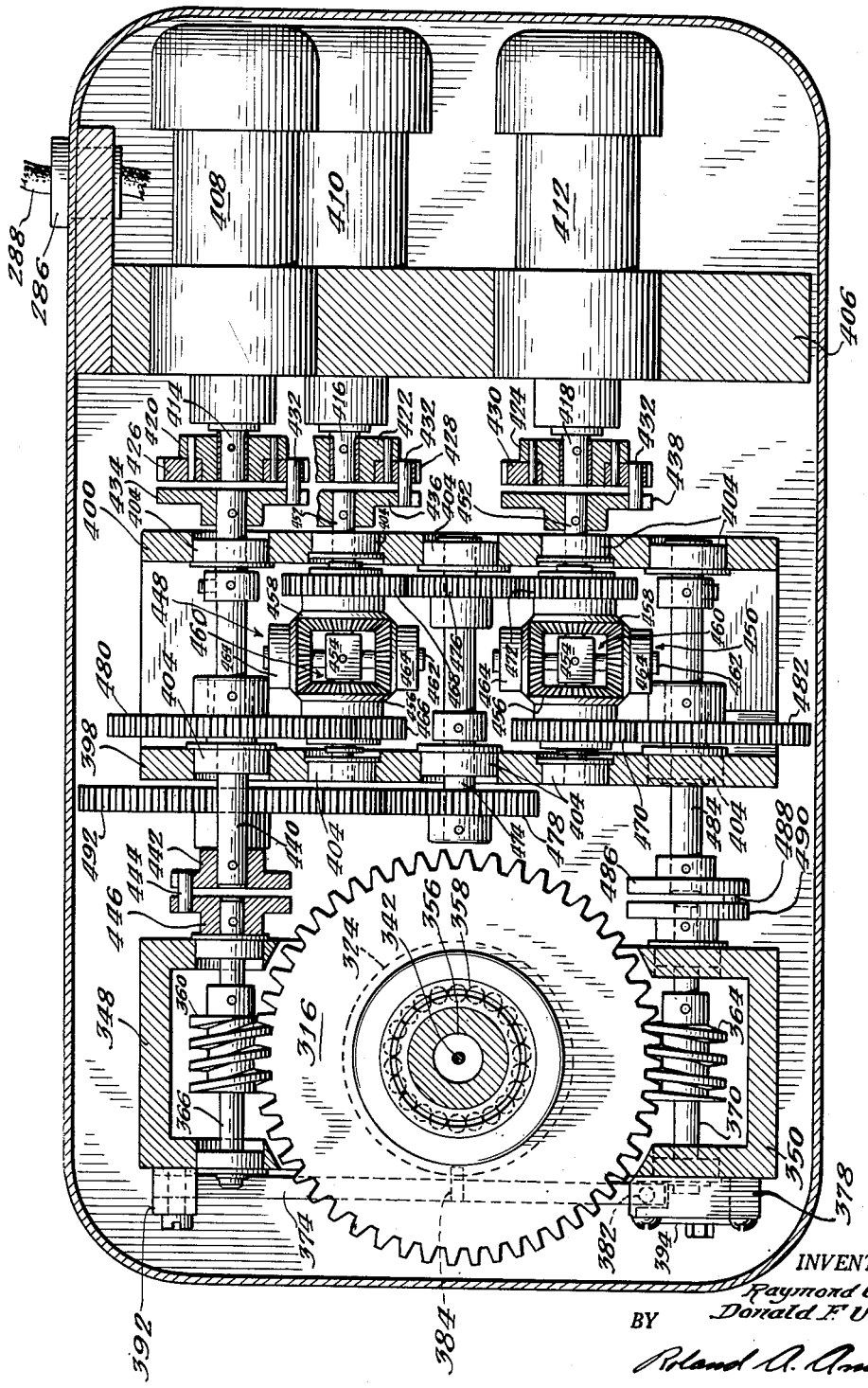
Figure 16 is a horizontal sectional view taken on the line 16—16 of Figure 14.

As shown in Figures 14 and 16 the operating parts of the gear assembly 40 are mounted on several support elements. In particular a pair of C-shaped uprights 348 and 350 are secured at either end of the mounting support 292 perpendicular thereto. As shown in Figures 16 and 17, the uprights 348 and 350 are oppositely disposed on either side of the worm gears 296, 306 and 316. Secured to the top of these uprights is a bridge 352 which provides more rigid support therefor and, in addition, includes an annular protrusion 354 extending downwardly into the upper hub 320 of the worm gear 316. The center of the protrusion 354 is aligned with the bore 340 of said worm gear and with an aperture 356 in the bridge 352 midway between the uprights 348 and 350. Through the aperture 356 passes the cord 342. Between the protrusion 354 and the upper hub 320 is disposed a bearing 358 that supports the worm gear 316.

One of the purposes of the uprights 348 and 350 is to provide support for three worms 360, 362, and 364 which are mounted on and driven by shafts 366, 368, and 370, respectively. As shown in Figures 16 and 17, the worm 360 meshes with the top worm gear 316 and the shaft 366, on which said worm is mounted, is journalled on either side thereof in a conventional manner to the upright 348. Directly below this is the worm 362 which meshes with the worm gear 306, and the shaft 368, on which it is mounted, is journalled on either side thereof in the upright 348, similar to the shaft 366. On the lowest level the worm gear 296 meshes with the worm 364, and the shaft 370 on which it is mounted is journalled to the upright 350 in a manner similar to the shafts 366 and 368 above described. It is pointed out that the worm 364 has a left-hand thread as distinguished from the right-hand threads on the worms 360 and 362 (Figure 14).

A limit switch, generally indicated at 372, is disposed on the outer surfaces of the uprights 348 and 350 between the gear wheels 306 and 316 (Figure 17). Being adapted to function with the helical groove 324 on the worm gear 316, the limit switch 372 comprises a bar 374, a lower microswitch 376, and an upper microswitch 378. Said microswitches are mounted on the upright 350 in the same plane as the bar 374 so that the end of the bar disposed therebetween will actuate either a switch button 380 on the switch 376, or a button 382 on the switch 378. Being designed to function more or less as a first class lever, the bar 374 has a pivot pin 384 extending into the helical groove 324. At the end of said bar remote from the limit switches is disposed a pin 386 which extends in a direction opposite to that of the pivot pin 384 and into an elongated slot 390 of a pin retainer 392. The end of the bar 374 between the switches 376 and 378 is confined to vertical movement between said switches by a guide 394. The purpose of the limit switch 372 is to prevent the rotation of the gear 316 and the inner tube 160 to which it is attached beyond a given number of clockwise or counter-clockwise revolutions which, if not inhibited, would cause the cords 210 and 342 attached to either end of the cable tube 212 to twist, resulting in reduced resilience and, therefore, binding of the cords on their respective pulleys. For example, as the tube 160 is rotated in a counter-clockwise direction, the pivot pin 384 follows the helical groove 324 downwardly, causing both ends of the bar 374 to drop until the pin 386 contacts the lower end of the slot 390 and the opposite end of said bar is depressed against the button 380 of the switch 376. This cuts off the current to a motor 408 that turns the gear 316 (hereinafter to be described); it being only possible thereafter to operate said motor in the opposite direction. Likewise, when the tube 160 is rotated in a clockwise direction the pivot pin 384, following the helical groove 324, rises until the free end of the bar 374 strikes the button 382 of the limit switch 378. Since the number of turns on the helical groove 324 is sufficient for practical operation of the manipulator and rotation of the tongs 36, an operator of the manipulator is not unduly limited in the number of turns in either direction which can be made. Under normal operation the tongs 36 will be turned a comparatively equal number of times in each direction whereby the pin 384 asumes a central position on the helical groove 324, in which case the limit switches 376 and 378 will never actuate. Figure 21 indicates the manner in which the electrical connections are made.

Referring now to Figures 14 and 15, other support elements may be considered in addition to the uprights 348 and 350. Attached to the base plate 282 substantially centrally thereof is a bracket base 396 extending transversely of said plate. Along one edge of the bracket base 396 parallel to the mounting support 292 is a bracket 398 secured to and normal to said base. To the other edge of the base 396 is attached a bracket 400 parallel to the bracket 398. A bridge 402 spans the brackets 398 and 400 at the top for increased rigidity. The brackets 398 and 400 are apertured at a number of places to receive conventional shoulder bearings 404.

The remaining support element is a motor mount 406 secured to the base plate 282, extending perpendicular therefrom and parallel to the bracket 400. The motor mount 406 is apertured in three places on axes parallel to the base plate 282 to accommodate three motors, namely, the azimuth motor 408, an elevation motor 410, and a twist motor 412, which motors are provided with shafts 414, 416 and 418, respectively. (Figure 16.) By way of orientation the azimuth motor 408 is adapted primarily to rotate the azimuth tube 160 which rotates the tongs 36 about an axis normal to said tube. The elevation motor 410 is adapted primarily to rotate the elevation tube 162 which causes the tongs 36 to rotate in a vertical plane passing through the axis of said tube. Finally, the twist motor 412 rotates the twist tube 164, twisting the tongs 36 about their longitudinal axis. The mechanism by which these rotations are accomplished includes the differential gear assembly 46 that is about to be described.

Secured to the end of each motor shaft 414, 416, and 418 is a bushing 420, 422 and 424, respectively, on which is mounted a pin clutch gear 426, 428, and 430, respectively. By means of a similar clutch pin 432 the gears 426, 428, and 430 are connected to a female pin clutch 434, 436, and 438, respectively. The pin clutch 434 is attached to the end of horizontal shaft 440 which extends through and is journalled in the brackets 400 and 398. To the other end of said shaft is mounted a female pin clutch 442 which, by means of a clutch pin 444, is connected to a male pin clutch 446 that, in turn, is mounted on the end of the shaft 366. By virtue of this assembly it is evident that the azimuth motor 408 drives the worm 369 which meshes with the worm gear 316 on top of the azimuth tube 160.

Between the brackets 398 and 400 are disposed two differential gears generally indicated at 448 and 450. These gears are conventional in design and have similar parts comprising an axial shaft 452, a box 454 integral with said shaft substantially centrally thereof, a pair of side gears 456 and 458 rotatably disposed on said shaft on either side of the box 454, and a cage generally indicated at 460. The cage comprises a shaft 462 which is perpendicularly mounted to the box 454, and a pair of cage gears 464 which are mounted to either end of the shaft 462 and each of which meshes with both side gears 456 and 458 on either side thereof. The shafts 452 of the differential gears 448 and 450 are journalled to the brackets 398 and 400 on either side of said gears and in alignment with motor shaft 416 and 418 to which they are linked by virtue of their connection to the female pin clutches 436 and 438, respectively. In addition spur gears 466 and 468 are secured to the side gears 456 and 458, respectively, of the differential gear 448. Likewise, spur gears 470 and 472 are secured to the side gears 456 and 458, respectively, of the differential gear 450.

Between the differential gears 448 and 450 is disposed a shaft 474, journalled to the brackets 398 and 400, and on which is mounted a spur gear 476 which meshes with the spur gears 468 and 472. Also a spur gear 478 is mounted to the opposite end of said shaft which end extends through the bracket 398. It is pointed out that the spur gears 466, 468, 470, 472, and 476 have equal dimensions.

Figure 18:
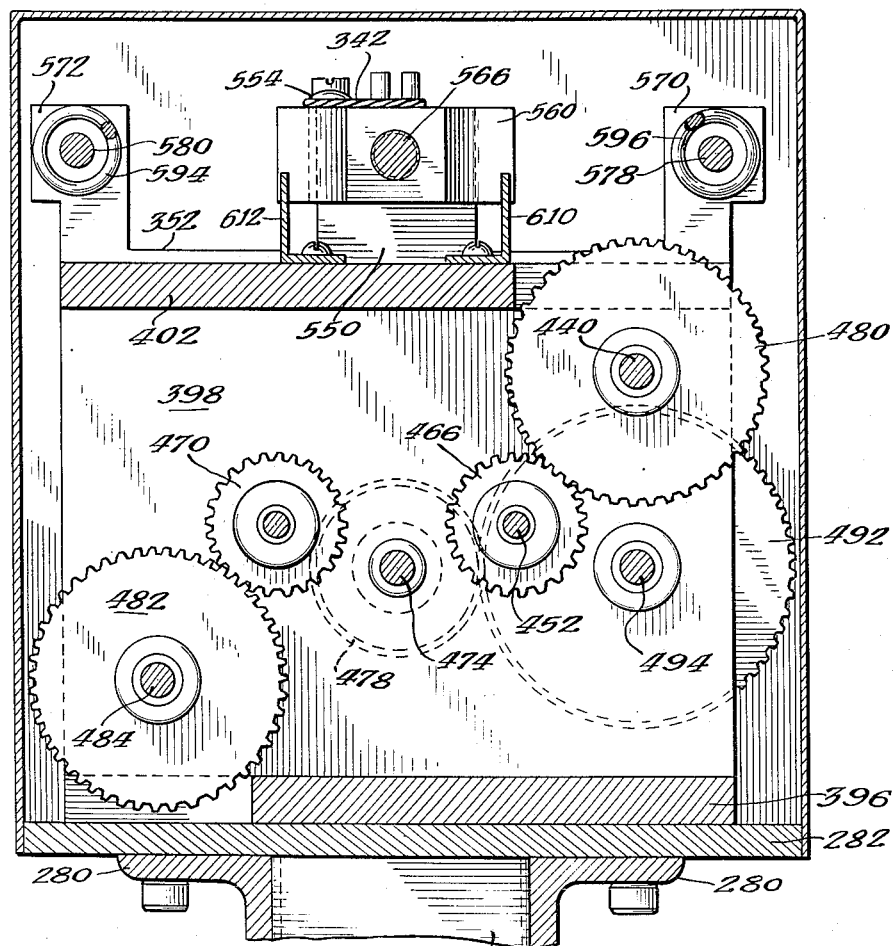
Figure 18 is a vertical sectional view on the line 18—18 of Figure 14.

The spur gear 466 meshes with a spur gear 480 secured to the shaft 440. Similarly the spur gear 470 meshes with a spur gear 482 mounted on a shaft 484 which is journalled to the brackets 398 and 400 and on one end of which is secured a female pin clutch 486. By means of a pin 488 this pin clutch is linked to a male pin clutch 490 that is secured to the end of the shaft 370. In addition, the spur gear 478 meshes with a spur gear 492 secured to a shaft 494 (Figures 14 and 18) which is linked to the shaft 368 by means of a pin clutch generally indicated at 495, similar in construction and parts to the pin clutches mentioned above. It is pointed out that the diameter of the gears 480 and 482 are equal to each other and have twice as many teeth as the gears with which they mesh (Figure 18). Also the gear 492 has twice as many teeth as the gear 478 which, in turn, is slightly larger than the gears 466, 468, 476, 472 and 470 for the reason that the lineal distance between the shafts 474 and 494 is slightly greater than the distance between the shafts 452 and 440. Suffice it to say the purpose of the gears with the larger diameters is to reduce the speed by a factor of two in order to drive the worm gears 296, 306, and 316 at the unit speed of each of the motors 408, 410, and 412. Moreover, the unit speed of said motors is multiplied by a factor of two when transmitted through either of the differential gears 448 or 450, for reasons inherent in the operation of said gears and well known in the art.

Figure 19:
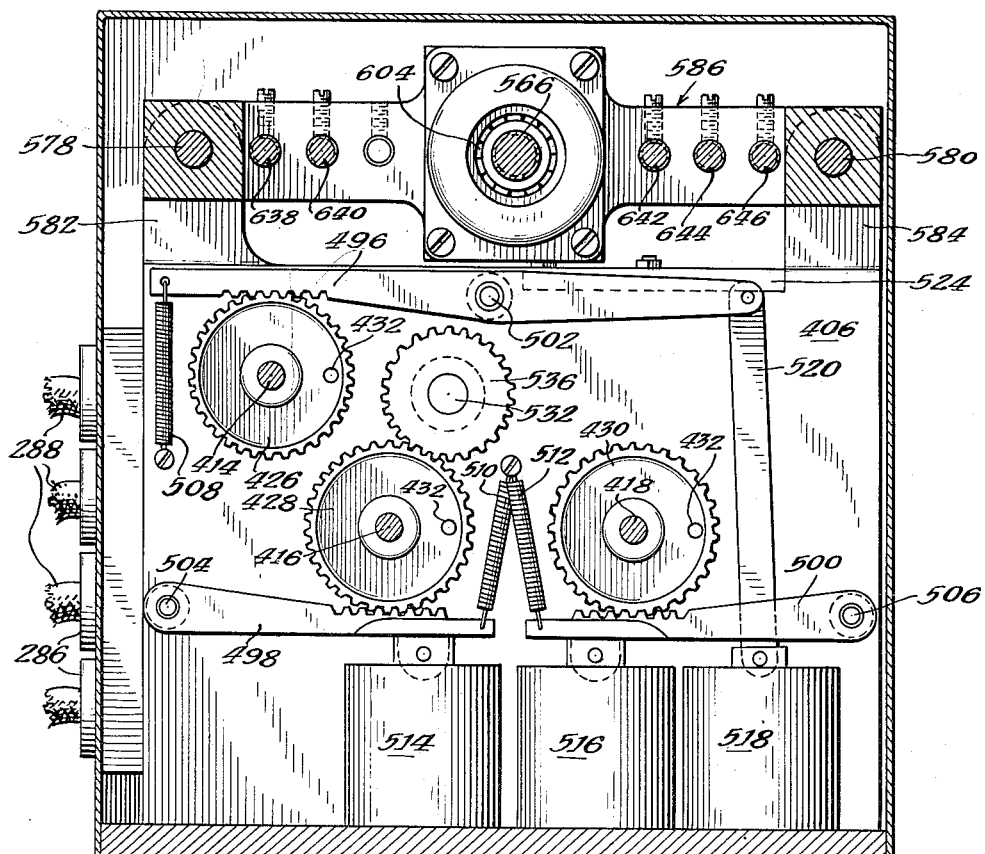
Figure 19 is a vertical sectional view taken on the line 19—19 of Figure 14.

Inasmuch as the assembly of gears interconnects the shafts 366, 368, and 370 by which separate directions of rotation are transmitted to the tongs 36, it is necessary to separately lock the shafts of each motor in place when one or two motors are being operated, in order to prevent rotation of the shaft due to the backlash of rotational friction of the operated motors. Accordingly, to each pin clutch gear 426, 428, and 430 (Figure 19), a pivot rack 496, 498, and 500, respectively, is attached. The racks 496, 498, and 500 are pivoted to the motor mount 406 by means of pivot pins 502, 504, and 506, respectively, and are held in engagement with their corresponding gear by means of a tension spring 508, 510, and 512, respectively. Solenoids 514, 516, and 518 are secured to the base plate 282 (Figure 14), and are connected in parallel (Figure 21) with the motors 410, 412, and 408, respectively. As shown in Figure 19 the solenoids 514 and 516 are directly linked to the pivot racks 498 and 500, respectively, while the solenoid 518 is indirectly attached to the pivot rack 496 by means of the pivot link 520. Hence when a given motor is actuated the corresponding solenoid disengages the pivot rack from the corresponding clutch gear, the remaining clutch gears being fixed in position by their corresponding pivot racks.

Figure 20:
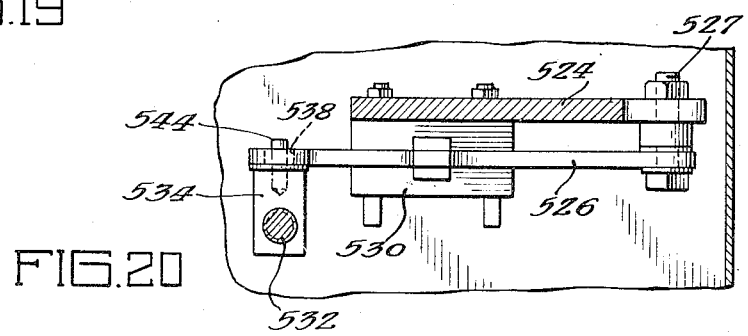
Figure 20 is a vertical sectional view of a limit switch for an elevation motor taken on the line 20—20 of Figure 15.

As shown in Figures 14, 15 and 20 a limit switch generally indicated at 522 is disposed on the motor mount 406. The limit switch 522 comprises a horizontal brace 524 secured to the motor mount 406, a switch actuator 526 pivoted at one end by a bolt 527 to said brace, limit switches 528 and 530 attached to said brace on either side of said actuator, a lead screw 532 journalled through the motor mount 406, a lead nut 534 on said screw, and a spur gear 536 on the end of said screw and meshing with the pin gear 428 mounted on the shaft 416 of the elevation motor 410 (Figure 19). At the end of the switch actuator 526 (Figure 15) above the screw 532 a slot 538 is disposed horizontally. In addition, two oppositely disposed protrusions 540 and 542 extend into the limit switches 528 and 530, respectively. Extending above the lead nut 534 is a pin 544 adapted to move in the slot 538 between the ends thereof, causing the protrusion on the side of the actuator 526 to open its corresponding switch whenever the pin 544 moves against the corresponding end of the slot 538. This shuts off the elevation motor 410, permitting it to be actuated only in the reverse direction. The purpose of the limit switch 522 is to prevent the collision of the gear 214 (Figures 10 and 11) with the gear 172 on either side thereof.

Having set forth the differential gear assembly it is possible to describe the manner of operation with respect to the three degrees of rotation of the tongs 36 made possible by said assembly. The remaining elements not yet described which are disposed at the top of the differential gear assembly 40 are adapted to the closing of the jaws 38 on the tongs 36, and will be described fully below. Considering one direction of rotation at a time, the rotation of the tongs 36 about their longitudinal axis is governed primarily by the twist motor 412. Referring to Figure 16, if said motor alone is actuated in the clockwise direction, the motion is transmitted through the shaft 452 at a unit speed to the differential gear 450. The box 454, turning with said shaft, rotates the cage 460, thereby transmitting the rotation to the side gear 456 in the same direction at two units of speed. The side gear 472 remains stationary because it meshes with the fixed spur gear 476. Consequently the motion is transmitted to the shaft 484 via the spur gear 482 which, having a diameter twice that of the gear 470, reduces the speed to one unit counterclockwise. Clearly this motion is transmitted from the shaft 484 to the worm 364 which rotates the worm gear 296 and the twist tube 164 clockwise (Figure 17). At the lower end of said tube (Figure 10) the gear 172 rotates the gear wheel 202 which, in turn, rotates the gear 214 counterclockwise, which is the direction of the rotation of the jaws 38 about their longitudinal axis.

When the elevation motor 410 alone is actuated in a clockwise direction, the shaft 452 turning at a unit speed transmits the motion to the cage 460 of the differential gear 448. In this situation the side gear 456 is held motionless because the gear 466 meshes with the stationary gear 480. Hence the cage 460 rotates clockwise, causing the side gear 458 and the spur gear 468 to which it is attached to revolve clockwise at two units of rotation. This is transmitted to the central shaft 474 at the same speed counterclockwise by virtue of the gear 476 and to the gear 478 which in turn engages the large gear 492 whereby the two units of rotation are again reduced to one unit in the clockwise direction. Accordingly, the motion is transmitted to the shaft 494 (Figure 14) which, by the pin clutch 495, is transmitted to the shaft 368 on which the worm 362 is disposed (Figure 17). From the worm 362 the motion is transferred counterclockwise through the worm gear 306 to the central tube 162. Returning to Figure 16 when the gear 476 is actuated by the gear 468 at two units of revolution the motion is transferred also to the gear 472. This motion is transmitted to the gear 470 through the gears 464 which revolve about their axis on either end of the shaft 462. From the gear 470 the motion moves to the worm 364, it being reduced to one unit of rotation by the larger gear 482 on the shaft 484. Through the worm gear 296 engaging the worm 364 the motion is transmitted to the tube 164 counterclockwise. Thus when the elevation motor 410 alone is actuated in the clockwise direction there results a counterclockwise rotation of the tubes 162 and 164 at the same speed. These rotations are transmitted separately to the gear wheels 200 and 202 counterclockwise (Figures 8, 10 and 11), whereby the former wheel rotates the tongs 36 counterclockwise about the shaft 190 while the latter wheel rotates the gear 214 at the same speed clockwise in order to prevent the jaws 38 from rotating about their longitudinal axis (which would be the case if the gear wheel 202 did not turn). It is pointed out that if the gear wheel 200 alone were rotated, and the gear wheel 202 remained stationary, the gear 214 would revolve about the gear wheel 202 causing the jaws 38 to twist about the longitudinal axis of the tongs and thereby overturning any container between said jaws.

Returning to Figure 16 there remains the consideration of actuating the azimuth motor 408 while the motors 410 and 412 remain motionless. In this event one unit of rotation of the motor 408 clockwise is transmitted directly through the shafts 440 and 366 to the worm 360 by which the worm gear 316 is rotated counterclockwise. In addition the gear 480 on the shaft 440 is rotated clockwise, transmitting said motion to the gear 466 at two units of rotation counterclockwise. This motion moves through the differential gear 448 to the gear 468 which turns clockwise. In turn the gear 476, revolving counterclockwise at two units of revolution, turns the gear 478 counterclockwise and the gear 472 clockwise. The gear 478 transmits its motion to the gear 492 clockwise at one revolution, whereby the worm 362 (Figure 17) actuates the worm gear 306 counterclockwise. Further, the gear 472 rotating clockwise at two units of revolution, transmits said revolution through the differential gear 450 to the gear 470 in the reverse direction. Hence the gear 482 revolves clockwise at one unit of revolution, causing the worm 364 to drive the worm gear 296 in the counterclockwise direction. Thus by actuating the motor 408 clockwise the three worm gears 296, 306, and 316 are actuated counterclockwise. Upon being transmitted through concentric tubes 160, 162 and 164 the tongs 36 rotate about three axes, namely, the vertical axis of said tubes, the horizontal axis of the shaft 190, and the longitudinal axis of said tongs.

Clearly from the above analysis when two or more motors are actuated simultaneously, either clockwise or counterclockwise, the motions are resolved through the differential gears 448 and 450, resulting in varying speeds of rotation and direction about the three axes of rotation of the tongs 36.

There remains for consideration the mechanism by which the jaws 38 are actuated. Considering Figure 11 it was mentioned above that the rollers 256 and 258 are separated by the cone 228 when the latter is moved to the right, thereby closing said jaws. Conversely, when the cone 228 is moved to the left by the spring 236, the jaws 38 are opened with the aid of the spring 254. As was also mentioned above the cone 228 is urged to the right by the cord 210, the other end of which is secured to the lower end of the cable tube 212 (Figure 8). The cable tube 212 is sustained in position by the cord 342 (Figure 17), which passes over the pulley 344 on the shaft 346. As shown in Figure 15 each end of the shaft 346 is mounted in a block 550, secured at the top of the bridge 352. Central of the block 550 is a vertical slot 552 aligned with the aperture 356 directly over the cable tube 212. In this manner the cord 342 is mounted over the pulley 344 in said slot and is anchored to a post 554. On either side of the block 550 is disposed a pair of rollers 556 mounted on either end of a shaft 558 disposed in said block. The rollers provide support for a yoke 560 the arms of which extend along opposite sides of the block 550. In each arm is a longitudinal slot 562 (Figure 14) the sides of which glide over the periphery of the corresponding rollers 556. At the center of the yoke 560 is a longitudinal bore 564 which is threaded to receive an elongated screw 566. On one side of the yoke 560 is a limit switch arm 568 the purpose of which will be described below.

Referring to Figures 15 and 18, the bridge 352 has two upright support members 570 and 572 integral therewith, one on either side. The members 570 and 572 have a longitudinal bore 574 and 576, respectively, centrally disposed therein which serve as terminals for two guide rods 578 and 580. The guide rods 578 and 580, being parallel to the screw 566, extend across the top of the differential gear assembly 40 to the motor mount 406 to which the ends of said rods are secured in support elements 582 and 584, respectively, integral with said mount. Slidably disposed on the rods 578 and 580 is a tension bridge, generally indicated at 586, which comprises a cross piece 588 and a pair of arms 590 and 592 integral with said crosspiece and mounting the rods 578 and 580, respectively, at either end thereof. Around each rod 578 and 580 is a spring 594 and 596, respectively, each of which abuts a corresponding upright support member on one side and an arm of the tension bridge 586 on the other side. These springs, being calibrated to a given spring-rate, are adapted to function in cooperation with a series of limit switches for varying degrees of tension in the jaws 38 of the tongs 36, to be described below.

At the center of the crosspiece 588 is an aperture 598 that is aligned with the screw 566. This aperture supports a tension motor 600 extending from the side of the crosspiece 588 remote from the screw 566, and it supports an annular bearing housing 602 in which is disposed an annular bearing 604. The end of the screw 566 remote from the yoke 560 extends through the bearing 604 where it is secured by a flange 606 integral with said screw and abutting said bearing. This end of the screw 566 includes a brooched bore 608 which matches the end of the shaft of the motor 600. Accordingly, when the motor 600 is activated, the screw 566 turns within the yoke 560, drawing it and the cord 342 toward said motor. This operates to close the jaws 38 of the tongs 36. Contrarily, when the motor 600 is activated in the reverse direction, the screw 566 urges the yoke 560 to the left, thereby relieving the tension in the cord 342 which act permits the jaws 38 to open.

Associated with the operation of the jaws 38 of the tongs 36 is a series of limit switches connected electrically to the motor 600 (Figure 21). These switches, disposed in two banks of three, are mounted in a pair of switch brackets 610 and 612 atop the bridge 402 on opposite sides of the screw 566. The bank of switches mounted in the brackets 610 comprise switches 614, 616, and 618 having a switch button 620, 622, and 624, respectively. Similarly the bank of switches disposed between the switch bracket 612 comprise switches 626, 628, and 630, having buttons 632, 634, and 636, respectively. Extending from the crosspiece 588 on one side of the motor 600 are two switch actuator screws 638 and 640, the ends of which are tapered and adapted to contact the switch buttons 620 and 622, respectively, when the tension bridge 586 is drawn towards the yoke 560. Likewise, on the crosspiece 588 on the other side of the motor 600 are disposed three switch actuator screws 642, 644, and 646 that are adapted to function with switch buttons 632, 634, and 636, respectively.

The combination of the springs 594 and 596 together with the aforementioned limit switches provides four degrees of tension in the jaws 38 of the tongs 36. These degrees are denoted arbitrarily by the switches 630, 616, 628, and 626 in increasing degrees. The purpose of the switch 614 is to sustain a closed circuit to the motor 600 until the crosspiece 588, moving along the guide rods 578 and 580, abuts the support elements 582 and 584. At this point the screw 638 moves off the button 620 to open the circuit to the motor 600. When the jaws 38 are open and it is desired to grasp an object between them with the least amount of tension possible by the manipulator, the operator at the control box (not shown in the drawing) selects a tension position connected to the switch 630. The selection is made by a tension selector 664, shown in Figure 21. Immediately the motor 600 rotates the screw 566 drawing the yoke 560 to the right and pulling the cord 342 with it over the pulley 344. This action closes the jaws 38 upon the object to be handled at which point resistance is offered by said object to further closing of the jaws, whereupon the yoke 560 is drawn no further to the right. It is pointed out that until this moment the springs 594 and 596 have been fully extended. When the yoke 560 no longer moves to the right, the tension bridge 586 begins to move to the left along the guide rods 578 and 580 against the springs 594 and 596. The force of the springs 594 and 596 against the tension bridge 586 is conveyed through the parts in tension to the jaws 38 with increasing degree until the switch actuator screw 646 travels far enough to the left to depress the switch button 636. At this moment the desired tension in the tongs 36 are achieved and the motor 600 is shut off (Figure 15). If an increased degree of tension is desired, the operator makes his selection on the selector 664 connected to the switch 616. In this event the tension bridge 586 continues to move to the left until the switch actuator screw 640 depresses the button 622 of said switch at which position the circuit to the motor 600 is opened. Further, if still more tension in the jaws 38 is desired the selection is made to the switch 628. The circuit is closed and the motor 600 rotates the screw 566 within the yoke 560, causing the tension bridge 586 to compress the springs 594 and 596 with increasing force until the switch actuator screw 644 depresses the switch button 634, opening the circuit to said motor. By the same analysis the fourth and greatest degree of tension may be attained in the jaws 38 when the switch actuator screw 642 depresses the button 632.

The button 624 of the switch 618 is operated by the limit switch arm 568 to shut off the motor 600 in event the cord 342 should break. In such event the springs 594 and 596 urge the tension bridge 586 to the right until they are fully extended, a point slightly to the right of that shown in Figure 15. Simultaneously the motor 600 continues to draw the yoke 560 toward it at the risk of breaking some part of the mechanism, because the particular limit switch selected is uncovered by its corresponding actuator screw. This mishap is insured against by the switch 618, a master switch. Thus, the yoke 560 approaches the motor 600 until the switch arm 568 depresses the button 624, opening the circuit to the motor 600.

The electrical circuit for the manipulator and the manner in which it is connected to the control box is shown in Figure 21. As indicated, each motor 62, 94, 96 and 412 is connected to a D. C. supply through a double-pole double-throw switch 650, 652, 654 and 656, respectively, on the control box. Likewise each motor 408, 410, and 600 is connected to a D. C. supply through a four-pole double-throw switch 658, 660 and 662, respectively. These switches serve to reverse the current and the direction of operation of the motor. When a limit switch is opened as a result of operating a corresponding motor to a limit position, the motor can be operated only in the reverse direction until the limit switch is again closed. For example, the motor 410 rotates the tongs 36 about the shaft 190 (Figure 10) and in order to prevent the gear 214 from colliding with the gear 172 on either side, the limit switches 528 and 530 are provided to break the circuit to the motor before such collision occurs. Said motor can then be operated only in the reverse direction by reversing switch 660. The switches 528 and 530 are normally in a closed position (Figure 21), and both are never open simultaneously. However, by connecting one terminal of each switch to the movable portion of the switch 660, the motor 410 can be reversed when either of the switches 528 and 530 is opened.

The foregoing is applicable to the motor 408 with the switch 658 and to the motor 600 with the switch 662. However, the motor 600 is limited in its operation by the tension switches 616, 626, 628 and 630, which were explained above, and each of which is connected between the switches 662 and 618. Accordingly, when the operator throws the switch 662 to the "A" side and, with the tension selector 664 on the control box, makes the selection shown in Figure 21, the motor 600 will cause the jaws 38 to close and the cross-piece 588 (Figure 15) to move to the left until the switch actuator screw 642 depresses the button 632, opening the limit switch 626 and stopping said motor. On the other hand, if the switch 662 is thrown to the "B" side, the jaws 38 are opened and if said switch is not opened when the operator observes such fact, the motor 600 continues to operate and the crosspiece 588 begins to move toward the support elements 582 and 584 until the end of the switch actuator screw 638 (Figure 15) releases the button 620 of the switch 614 which is then opened, stopping the motor. In the event either of the jaw cords 210 and 342 should break, the switch 618 is opened as set forth above.

Since certain changes can be made in the foregoing device and different steps may be employed in practicing the same, it is intended that the above matter shown in the accompanying drawings and described hereinbefore shall be interpreted as illustrative only and may be modified without departing from the intended scope of the invention.

What is claimed is:

1. A remote control manipulator comprising a support unit, a manipulatable instrument at one end of the unit, control means remote from the instrument including a prime mover at the other end of the unit, a pinion secured to the instrument about its longitudinal axis, and means for mounting the instrument on one end of the unit including a stem on which the pinion is rotatably mounted, the means also including a pair of gear wheels independently driven, one of which wheels engages the pinion, and the other of which is fixed to the stem, the supporting unit including motion-conveying means operatively connecting the prime mover to the mounting means so as to cause rotation of the instrument about three axes separately or combined in response to operation of the control means.

2. A remote control manipulator comprising a support unit, a manipulatable instrument at one end of the unit, control means remote from the instrument including a prime mover at the other end of the unit, a pinion secured to the instrument about its longitudinal axis, and means for mounting the instrument on one end of the unit including a stem on which the pinion is rotatably mounted, the means also including a pair of parallel gear wheels independently driven on an axis normal to that of the pinion, one of which wheels engages the pinion and the other of which is fixed to the stem, the support unit including a motion-conveying means operatively connecting the prime mover to the mounting means so as to cause rotation of the instrument about three axes separately or combined in response to operation of the control means.

3. A remote control manipulator comprising a support unit, a tongs on the unit and including a pair of movable jaws, control means including a prime mover on the unit and remote from the tongs, a pinion secured to the tongs about the longitudinal axis of the jaws, means for mounting the tongs on one end of the unit including a stem on which the pinion is rotatably mounted, the means also including a pair of gear wheels independently driven, one of which wheels engages the pinion, and the other of which is fixed to the stem, the support unit including motion-conveying means operatively connecting the prime mover to the mounting means so as to cause rotation of the tongs about three axes separately or combined in response to operation of the control means, and means linking the prime mover to the jaws so that operation of the control means imparts movement to the jaws.

4. A remote control manipulator comprising a support unit, a tongs on the unit and including a pair of movable jaws, control means including a prime mover on the unit and remote from the tongs, a pinion secured to the tongs on the longitudinal axis of the jaws, means for mounting the tongs on one end of the unit including a stem on which the pinion is rotatably mounted, the means also including a pair of parallel gear wheels between the unit and the tongs independently driven on an axis normal to that of the pinion, one of which wheels engages the pinion and the other of which is fixed to the stem, the supporting unit including a motion-conveying means operatively connecting the prime mover to the mounting means so as to cause rotation of the tongs about three axes separately or combined in response to operation of the control means, and means linking the prime mover to the jaws so that operation of the control means imparts movement to the jaws.

5. A remote control manipulator comprising a support unit, tongs on the unit and including a pair of movable jaws, control means including a prime mover on the unit and remote from the tongs, a pinion secured to the tongs on the longitudinal axis of the jaws, means for mounting the tongs on one end of the unit including a stem on which the pinion is rotatably mounted, the means also including a pair of gear wheels, one of which wheels engages the pinion and the other of which is fixed to the stem, the support unit including two tubes longitudinally disposed therein which are linked to the prime mover at one end, one of said tubes being coupled at the other end to one gear wheel and the other of said tubes coupled at the other end to the other gear wheel, said tubes being adapted to cause rotation of the tongs about two axes separately or combined in response to operation of the control means, and means linking the prime mover to the jaws so that operation of the control means imparts movement to the jaws.

6. A remote control manipulator comprising a support unit, tongs including a pair of movable jaws on the unit, control means including a prime mover on the unit and remote from the tongs, a pinion secured to the tongs on the longitudinal axis of the jaws, means for mounting the tongs on one end of the unit including a stem on which the pinion is rotatably mounted, the means also including a pair of parallel gear wheels on an axis normal to that of the pinion, one of which wheels engages the pinion and the other of which is fixed to the stem, the supporting unit including two concentrically disposed tubes therein which are linked to the prime mover at one end, one of said tubes being coupled at the other end to one gear wheel and the other of said tubes coupled at the other end to the other gear wheel, said tubes being adapted to cause rotation of the tongs about two axes separately or combined in response to operation of the control means, and means linking the prime mover to the jaws so that operation of the control means imparts movement to the jaws.

7. A remote control manipulator comprising a support unit, tongs including a pair of movable jaws on the unit, control means including a prime mover on the unit and remote from the tongs, a pinion secured to the tongs on the longitudinal axis of the jaws, means for mounting the tongs on one end of the unit including a stem on which the pinion is rotatably mounted, the means also including a pair of parallel gear wheels on an axis normal to that of the pinion, one of which wheels engages the pinion and the other of which is fixed to the stem, a first gear engaging one of said gear wheels, a second gear engaging the other gear wheel, the support unit including two tubes longitudinally disposed therein, the tubes being linked at one end to the prime mover, one of said tubes being connected at the other end to the first gear, the other of said tubes being connected at the other end to the second gear, said tubes being adapted to cause rotation of the tongs about two axes separately or combined in response to operation of the control means, and means linking the prime mover to the jaws so that operation of the control means imparts movement to the jaws.

8. A remote control manipulator comprising a support unit, tongs including a pair of movable jaws on the unit, control means including a prime mover on the unit and remote from the tongs, a pinion secured to the tongs on the longitudinal axis of the jaws, means for mounting the tongs on one end of the unit including a yoke disposed between the tongs and the unit on an axis normal to that of the pinion, a stem integral with the yoke on which the pinion is rotatably mounted, a pair of parallel gear wheels mounted on the axis on which the yoke is mounted, one of which wheels engages the pinion and the other of which is secured to the yoke, a first gear engaging one of said gear wheels, a second gear engaging the other gear wheel, two tubes concentrically disposed in the support unit, the tubes being linked at one end to the prime mover, one of said tubes being connected at the other end to the first gear, the other of said tubes being connected at the other end to the second gear, said tubes being adapted to cause rotation of the tongs about two axes separately or combined in response to operation of the control means, and means linking the prime mover to the jaws so that operation of the control means imparts movement to the jaws.

9. A remote control manipulator comprising a vertical tubular unit movable along its longitudinal axis, tongs including a pair of movable jaws disposed at the lower end of said unit, control means remote from the tongs including a prime mover attached to said unit and a differential gear assembly at the top of said unit, a pinion secured to the tongs on the longitudinal axis of the jaws, three tubes concentrically disposed within the unit, the upper ends of which tubes are geared to the differential gear assembly so as to cause rotations of each tube, a shaft mounted to the lower end of one tube and normal thereto between the unit and the tongs, a first gear secured to the lower end of another tube, a second gear secured to the lower end of the third tube, a yoke pivoted to the shaft, a stem integral with the yoke on which the pinion is rotatably mounted, two gear wheels mounted on the shaft, one of which wheels engages the pinion and the first gear and the other of which wheels engages the second gear and is secured to the yoke, said tubes being adapted to rotate the tongs about three axes, and means linking the prime mover to the jaws so that operation of the control means imparts movement to the jaws.

10. A remote control manipulator comprising a vertical tubular unit movable along its longitudinal axis, tongs including a pair of movable jaws disposed at the lower end of said unit, control means remote from the tongs including a prime mover attached to said unit and a differential gear assembly at the top of said unit, a pinion secured to the tongs on the longitudinal axis of the jaws, three tubes concentrically disposed within the unit, the upper ends of which tubes are geared to the differential gear assembly so as to cause rotations of each tube, a shaft mounted to the lower end of the tube of smallest diameter in the horizontal plane about which the tongs are adapted to rotate, a first gear secured to the lower end of the tube having the intermediate diameter, a second gear secured to the lower end of the tube having the largest diameter, a yoke pivoted to the shaft, a stem integral with the yoke on which the pinion is rotatably mounted, two gear wheels mounted on the shaft on the same side of the yoke, one of which wheels engages the pinion and the second gear and the other of which wheels engages the first gear and is secured to the yoke, said tubes being adapted to rotate the tongs about three axes, and means including a draw cord linking the prime mover to the jaws so that operation of the control means imparts movement to the jaws.

11. A remote control manipulator comprising a carriage movable in two horizontal directions, a support unit including an elongated tube suspended from the carriage and adapted to move along its longitudinal axis substantially perpendicular of the carriage, tongs including a pair of movable jaws, means mounting the tongs on one end of the unit and including a pair of gear wheels and a pair of gears, the gears being disposed concentrically with respect to each other, one gear meshing with one gear wheel and the other gear meshing with the other gear wheel, control means including a prime mover on the unit and remote from the tongs, means connecting the prime mover to the other end of the support unit including a train of gears, motion-conveying means including at least two tubes concentrically disposed within the elongated tube and operatively connected to the gears mounting the tongs and to the train of gears in the control means so as to cause rotation of the tongs in response to the control means, and means operatively connecting the prime mover to the jaws so that operation of the prime mover imparts movement to the jaws.

12. A remote control manipulator comprising a carriage movable in two horizontal directions, a support unit including an elongated tube attached to the carriage and adapted to move vertically along its longitudinal axis, tongs including a pair of movable jaws, a pinion secured to the tongs on the longitudinal axis of the jaws, means mounting the tongs on one end of the unit including a horizontal shaft, the means also including a yoke pivoted to the shaft, said yoke including an integral stem on which the pinion is rotatably mounted, the means also including a pair of gear wheels and a pair of concentric gears, the gear wheels mounted on the shaft, one of which wheels engages the pinion and one of the gears and the other of which wheels engages the other gear and is secured to the yoke, control means remote from the tongs including a prime mover on the unit and a train of gears at the top of the unit, motion-conveying means including three tubes concentrically disposed within the elongated tube and operatively connected to the gears mounting the tongs and to the train of gears so as to cause rotation of the tongs in response to the prime mover, and means operatively connecting the control means to the jaws so that operation of the prime mover imparts movement to the jaws.

13. A remote control manipulator comprising a support unit, a manipulatable instrument at one end of the unit, electrical control means including a prime mover and a gear assembly on the unit and remote from the instrument, a pinion secured to the instrument on its longitudinal axis, and means for mounting the instrument on the unit including a stem on which the pinion is rotatably mounted, the means including a pair of gear wheels independently driven, one of which wheels engages the pinion and the other of which is fixed to the stem, said assembly including at least one differential gear coupled to the motor, the unit also including two concentric tubes operatively connected between the gear wheels and the differential gear so as to cause rotation of the instrument about two axes separately or combined in response to operation of the control means.

14. A remote control manipulator comprising a support unit including a cantilever movable horizontally, a carriage movably disposed on the cantilever, the unit including an elongated tube on the carriage and adapted to move perpendicularly to the cantilever, tongs including a pair of movable jaws, a pinion secured to the tongs on the longitudinal axis of the jaws, means for mounting the tongs on the unit including a horizontal shaft, the means also including a yoke pivoted to the shaft, said yoke having an integral stem on which the pinion is rotatably mounted, the means also including a pair of gear wheels and a pair of gears, the gear wheels mounted on the shaft, one of which wheels engages the pinion and one of the gears, the other of which wheels engages the other gear and is secured to the yoke, electrical control box remote from the tongs, three reversible motors mounted on the unit electrically connected to said control box, motion-conveying means operatively connected between the gear wheels and the motors so as to cause rotation of the tongs about three axes separately or combined in response to operation of the motors, and a fourth reversible motor electrically connected to the control box and operatively connected to the jaws so that operation of said motor imparts movement of the jaws.

References Cited in the file of this patent

UNITED STATES PATENTS

| Number | Name | Date |
|---|---|---|
| 484,870 | Babbitt | Oct. 25, 1892 |